United States Patent Office 2,846,775
Patented Aug. 12, 1958

2,846,775

METHOD OF CONTACTING GRANULAR SOLIDS WITH GASEOUS FLUIDS

Wesley N. Lindsay, San Jose, Calif., assignor to Food Machinery and Chemical Corporation, San Jose, Calif., a corporation of Delaware No Drawing. Application January 8, 1954
Serial No. 403,061

12 Claims. (Cl. 34—10)

The present invention relates to methods of contacting gaseous fluids and granular solids, such as are employed in processes for the fractionation of gas streams wherein one or more gaseous components of the gas stream are reacted with or adsorbed upon such granular solids.

In processes of this kind the granular solids are allowed to gravitate within a closed vessel against a rising gas stream and are formed into a number of fluidized beds by horizontally disposed, vertically superposed perforated trays that are fastened along their peripheries to the inner wall of the vessel and through which pass tubular conduits known as downcomers for the down-flow of the granular solids from tray to tray as described in detail in my co-pending application No. 98,814 filed on June 13, 1949, now Patent Number 2,676,668. The velocity of the gas stream passing through the perforations in the superposed trays effects rapid agitation of the granular solids and thereby causes them to behave in a manner similar to the molecules of a liquid, a condition known as fluidization.

When the granular material to be contacted with a fluidizing gas stream is of high electrical resistivity, such as for instance thoroughly dry silica gel, it has been observed that the granules may agglomerate. This tendency of the granules in fluidized beds to adhere to each other has an effect comparable to an increase in the viscosity of a liquid; in other words: their motion becomes sluggish and it is difficult to maintain smooth and uniform fluidization over the surface of the perforated trays.

Loss of fluidization caused by agglomeration of the granules may interfere with the free flow of the granules through the downcomers. This causes an excessive number of granules to gather in the upper part of the contacting vessel because the granular solids will continue to be fed into the contacting vessel at a constant rate near the top end thereof, whereas the rate of their withdrawal from upper to lower trays may drop to zero.

This condition may be aggravated by the fact that the tendency of the granules to agglomerate is most severe on the uppermost tray of a contacting vessel where the moisture content of the granular material is at a minimum and the gas stream has reached its driest condition. Thus, the uppermost tray in the vessel may be flooded with granular solids. As a result significant quantities of the solids may be lost through the discharge conduit for the gas stream. Furthermore, channeling may occur in the flooded beds causing the gas stream to pass at high velocity through passages in the granular solids without sufficiently prolonged contact with the solids. Moreover, the high velocity gas currents thus established may sweep added amounts of the granular material through the gas discharge conduit at the top end of the contacting vessel.

It is an object of the present invention to prevent the described defects in the operation of contacting apparatus of the type referred to.

Another object is to prevent agglomeration of the granular solids in contacting apparatus of the type referred to.

Another object is to provide a method and means for maintaining fluidized beds of the type referred to in fluent condition.

Another object is to provide methods and means for preventing channeling of the fluidizing gas stream through the fluidized beds of a contacting apparatus of the type referred to.

Another object is to prevent loss of the granular solids from contacting apparatus of the type referred to.

I have found that the above described defects in the performance of a contacting process of the type referred to are caused by electrical charges which accumulate on the surface of granules of high electric resistivity during the contacting progress, especially when the atmosphere within the contacting vessel is very dry. In accordance with the invention I, therefore, introduce electrically conductive particles of much finer size than the granular solids into the contacting vessel such as, for instance, extremely fine dust of graphite, carbon black, copper oxide or zinc. Alternatively, I may cause ionization of the atmosphere within the contacting vessel by irradiation with ultra-violet light or with energy of even shorter wave length, or by placing plaques of a radioactive material into the contacting vessel.

Any one of the above mentioned measures causes the static charges on the granules of solid material to dissipate and thus eliminates the tendency of said solids to agglomerate so that the development of poor flow properties of the fluidized granules is either prevented or remedied. For instance, in a contacting vessel for the recovery of nitrogen dioxide wherein granular silica gel of an average particle size of about ⅛ of an inch was contacted with a rising stream of a thoroughly dry nitrogen oxide containing gas mixture fed into the vessel at a superficial velocity of about 7 feet per second for the purpose of absorbing the nitrogen dioxide component of the gas mixture upon the granules of silica gel, and wherein the total amount of silica gel in the contacting vessel at any particular time was of the order of from 100 to 150 pounds, the flow rate of the silica gel dropped from initial value of 15 pounds per minute to as low as 6 pounds per minute due to the accumulation of electrical charges upon the granular material. Upon introducing finely divided carbon dust of micron or even submicron particle size into the contacting vessel in quantities of about ⅓ of a pound per 100 pounds of silica gel, the clusters of silica gel granules separated and the flow rate of the granular material through the vessel could again be increased to 15 pounds per minute without channeling and without significant loss of silica gel through the gas discharge conduit of the vessel.

In other practical tests it was found that additions of .01% of carbon dust or .02% of powdered graphite or 1% of copper oxide or 2% of zinc dust, by weight, of the granular solid were equally effective in preventing the development, or effecting the dissipation, of static charges on the silica gel. As yet another alternative, silica gel granules were made conductive by treating them with a 2% aqueous solution of copper nitrate. After the excess liquid had been drained off, they were heated to regeneration temperatures so as to decompose the copper nitrate into conductive copper oxide that adhered to the silica gel granules. When silica gel granules, thus treated, were employed in contacting processes of the type here under consideration none of the above mentioned defects developed.

While I have explained my invention with the aid of certain embodiments thereof, I do not wish to be limited

I claim:

1. In the method of contacting gaseous fluids with granular solids having a high electrical resistivity wherein the gaseous fluid is passed upwardly through successive superposed beds of the granular material to fluidize the granular material and coact therewith, and wherein the fluidized granular material progressively flows downwardly from one bed to another, the improvement which comprises introducing finely divided electrical conductive particles into the contacting zone to prevent the agglomeration of the granular material by conducting any static electrical charges formed on the particles of said granular material away from said particles.

2. The method according to claim 1 wherein said electrically conductive particles are carbon black introduced in quantities of the order of ⅓% by weight of the granular solids.

3. The method according to claim 1 wherein said electrically conductive particles are graphite introduced in quantities of the order of .02% by weight of the granular solids.

4. The method according to claim 1 wherein said electrically conductive particles are copper oxide introduced in quantities of the order of 1% by weight of the granular solids.

5. The method according to claim 1 wherein said conductive particles are metallic zinc dust introduced in quantities of the order of 2% by weight of the granular solids.

6. The method according to claim 1 wherein the electrically conductive particles are permanently deposited upon the granular solids.

7. In fluidized beds of granular solids of high electrical resistivity the method of preventing agglomeration of the granular solids caused by static electrical charges accumulating thereon which comprises introducing finely divided electrically conductive particles into the fluidization zone.

8. In the method of contacting gaseous fluids with granular solids having a high electrical resistivity wherein the gaseous fluid is passed upwardly through successive superposed beds of the granular material to fluidize the granular material and coact therewith, and wherein the fluidized granular material progressively flows downwardly from one bed to another, the improvement which comprises preventing agglomeration of the granular material by introducing finely divided electrically conductive particles of micron or sub-micron size into the contacting zone to conduct any static electrical charges formed on the particles of said granular material away from said particles.

9. In the method of contacting gaseous fluids with granular solids having a high electrical resistivity wherein the gaseous fluid is passed upwardly through successive superposed beds of the granular material to fluidize the granular material and coact therewith, and wherein the fluidized granular material progressively flows downwardly from one bed to another, the improvement which comprises introducing finely divided carbon black into the contacting zone to prevent the agglomeration of the granular material by conducting any static electrical charges formed on the particles of said granular material away from said particles.

10. In the method of contacting gaseous fluids with granular solids having a high electrical resistivity wherein the gaseous fluid is passed upwardly through successive superposed beds of the granular material to fluidize the granular material and coact therewith, and wherein the fluidized granular material progressively flows downwardly from one bed to another, the improvement which comprises introducing graphite in finely divided form into the contacting zone to prevent the agglomeration of the granular material by conducting any static electrical charges formed on the particles of said granular material away from said particles.

11. In the method of contacting gaseous fluids with granular solids having a high electrical resistivity wherein the gaseous fluid is passed upwardly through successive superposed beds of the granular material to fluidize the granular material and coact therewith, and wherein the fluidized granular material progressively flows downwardly from one bed to another, the improvement which comprises introducing finely divided particles of copper oxide into the contacting zone to prevent the agglomeration of the granular material by conducting any static electrical charges formed on the particles of said granular material away from said particles.

12. In the method of contacting gaseous fluids with granular solids having a high electrical resistivity wherein the gaseous fluid is passed upwardly through successive superposed beds of the granular material to fluidize the granular material and coact therewith, and wherein the fluidized granular material progressively flows downwardly from one bed to another, the improvement which comprises introducing finely divided zinc dust into the contacting zone to prevent the agglomeration of the granular material by conducting any static electrical charges formed on the particles of said granular material away from said particles.

References Cited in the file of this patent

UNITED STATES PATENTS

| | | |
|---|---|---|
| 2,345,487 | Liedholm | Mar. 28, 1944 |
| 2,348,418 | Roesch et al. | May 9, 1944 |
| 2,473,539 | Merriam | June 21, 1949 |
| 2,497,501 | Himmel et al. | Feb. 14, 1950 |
| 2,578,377 | Smith | Dec. 11, 1951 |
| 2,724,190 | Bergstrom | Nov. 22, 1955 |